United States Patent [19]

Young et al.

[11] Patent Number: 5,407,172

[45] Date of Patent: * Apr. 18, 1995

[54] POSITION INSTRUMENTED BLOWOUT PREVENTER

[75] Inventors: Kenneth D. Young, Kingwood; Kenneth W. Colvin, Humble; Joseph L. Frederick, Cleveland, all of Tex.

[73] Assignee: Hydril Company, Houston, Tex.

[*] Notice: The portion of the term of this patent subsequent to Jun. 14, 2011 has been disclaimed.

[21] Appl. No.: 303,595

[22] Filed: Sep. 9, 1994

Related U.S. Application Data

[63] Continuation of Ser. No. 192,405, Feb. 4, 1994, abandoned, which is a continuation of Ser. No. 100,729, Aug. 2, 1993, Pat. No. 5,320,325.

[51] Int. Cl.$^6$ ............................................. E21B 33/06
[52] U.S. Cl. ...................................... 251/1.3; 137/554
[58] Field of Search ........................... 251/1.1, 1.2, 1.3; 166/64, 66, 66.4, 66.5, 179, 319; 137/554; 92/5 R

[56] References Cited

U.S. PATENT DOCUMENTS

| | | | |
|---|---|---|---|
| 4,325,534 | 4/1982 | Roark et al. | 251/1.3 |
| 4,384,612 | 5/1983 | Bradford et al. | 166/66 |
| 5,014,781 | 5/1991 | Smith | 166/66 X |
| 5,432,020 | 8/1994 | Stone | |

OTHER PUBLICATIONS

Understanding magnetostrictive LDTs, An introduction to magnetostritive linear displacement tranducers—the most popular means of producing an electric signal corresponding to cylinder position in fluid power systems, W. D. Peterson, Feb. 1993 from *Hydraulics & Pneumatics* magazine, pp. 32–34.

*Primary Examiner*—John C. Fox
*Attorney, Agent, or Firm*—Vaden, Eickenroht, Thompson, Boulware & Feather

[57] ABSTRACT

A ram of a ram-type blowout preventer is enclosed within an enclosure so that the piston driving the ram is placed parallel to a stationary magnetizable waveguide tube. A transverse ring-like magnet assembly surrounds the tube and is attached to a carrier that, in turn, is attached to the tail of the piston. The magnet assembly longitudinally magnetizes an area of the tube where it is located. A wire running through the tube is periodically interrogated with an electrical current pulse, which produces a toroidal magnetic field about the wire. When the toroidal field intersects with the longitudinally magnetized area, a magnetostrictive acoustical return pulse is reflected back up the tube for detection by a transducer located outside of the enclosure. The time that the acoustical pulse travels from the magnetic field intersection compared to the timing of the electrical pulse on the wire is a measure of distance since the pulse time essentially travels at the speed of light. Thus, the position of the ram is absolutely determined. From the position information from successive pulses, ram velocity and acceleration information can be developed. The measurements are continuous and absolute and are not incremental.

4 Claims, 3 Drawing Sheets

POSITION INSTRUMENTED BLOWOUT PREVENTER

This application is a continuation of application Ser. No. 08/192,405, filed Aug. 2, 1993, U.S. Pat. No. 5,320,325.

BACKGROUND OF THE INVENTION

1. Field of the Invention

This invention pertains to blowout preventer instrumentation and more particularly to the direct measurement of position, velocity, and rate of movement of the parts in a ram type blowout preventer.

2. Description of the Prior Art

Blowout preventers (BOP's) are employed at the wellhead of an oil or gas well as a safety device for shutting off the flow of fluids from the annulus of the well in the event of excessive build-up of pressure. Although there are many kinds of blowout preventers, one popular class is known as a "ram" type blowout preventer. In this type of blowout preventer, the well pipe extends through a central opening in the preventer housing or block. Guideways, usually two opposing ones, in the housing of the preventer are located transverse to the axis of the well pipe. Rams driven by hydraulically actuated pistons operate with respect to these guideways to reciprocate the rams to close off the annulus around the pipe when there is a need. Shear ram blowout preventers include rams having sharp edges for shearing off the pipe, rather than closing around it, so that these rams completely shut off the annulus and the pipe opening, as well, when they are closed.

Knowledge of the parameters of the conditions of the well at the blowout preventer is extremely important to maintaining proper operation of the well. From these parameters, the well can be controlled so that safe conditions can be maintained in ordinary circumstances of operation and when an unsafe condition is detected that cannot be controlled, shut down of the well can be appropriately initiated, either manually or automatically. For example, pressure transducers and temperature transducers are used at the blowout preventer to develop signals indicative of these respective conditions. These and other signals are typically presented as control signals on a control console employed by a well operator. This operator can, for example, control the operations of the well by con-trolling the rotating speed on the drill pipe, controlling the downward pressure on the drill bit, regulating the circulation pumps for the drilling fluid for a drilling operation and/or adjusting the extent that the annulus is opened or closed by actu-. ating the hydraulically actuated pistons connected to the reciprocating rams.

Heretofore, it has not been possible to know precisely the location of the rams, even though the operator might be controlling them. The control operator has had to rely on secondary measurements, such as well flow, to estimate the positions of the rams. Well flow, however, is affected by much more than how large the ram gap is. Thus, there has been a need for an improved measure of the ram gap in a more direct manner.

One device that has been employed in the past to develop a signal indicative of the relative position of component parts located in an enclosed housing (not necessarily in a blowout preventer housing) is a potentiometric transducer. Such a device employs one or more sensors that are subject to wear and inaccuracies in the presence of a harsh environment. Moreover, such sensors are subjected to being lifted from the surface of whatever is being tracked, which causes inaccuracies. Also, a loss of power often causes distorted readings because these devices operate incrementally, adding or subtracting values related to specific turns or segments of wire to a previous value. Moreover, devices such as these are notoriously poor high speed devices. Thus, potentiometric measurement would not be useful in accurately determining the position parameter of ram movement. In addition, since the velocity and rate conditions of ram movement are also important, potentiometric devices are not useful since they cannot provide, however imperfectly, such information at all.

It is further noted that incremental measuring devices of whatever sort for only keeping track of steps have the inherent shortcoming of having to be reset to a baseline in the event of a power failure as well as not providing the precision that is attendant to continuous measurement.

Therefore, it is a feature of the present invention to provide an improved apparatus for precisely measuring the location or position of a ram or ram piston in a blowout preventer.

It is another feature of the present invention to provide an improved instrumentation device that continuously and absolutely determines the position of a ram or a ram piston in a blowout preventer and which does not have to be reset in the event of power failure.

SUMMARY OF THE INVENTION

The instrumentation device of the present invention incorporates the components of a magnetostrictive linear displacement arrangement in combination with the components of a ram type blowout preventer. A ram in a blowout preventer is located in a guideway transverse to the central pipe-receiving bore or opening of the preventer and reciprocates to close and open on this central bore. A ram is motivated by a hydraulic piston located within the overall housing of the blowout preventer. An elongated magnetizable magnetostrictive waveguide tube is placed in a cylinder head enclosure connected to the preventer housing for accommodating the movement of the ram piston. The tube, which is sealed and capable of sustaining 4,500 psi of hydrostatic pressure exerted by the closing pressure of the ram BOP, is placed parallel to such piston movement. A ring-like magnet assembly is also located within the enclosure and is positioned around the tube. This assembly is attached or connected to a carrier that is, in turn, connected to the tail of the piston. The magnet assembly includes typically four permanent magnets in a plane transverse to the axes of the piston and the tube. These individual magnets are circumferentially evenly spaced around the tube and are located at a uniform distance from the tube. The ring-like assembly is set apart from engaging the surface of the tube and is mounted to move axially along the tube without touching it.

A conducting wire is located within the waveguide tube for periodically receiving an interrogation current pulse, which current pulse produces a toroidal magnetic field around the wire and in the tube. When this toroidal magnetic field encounters the longitudinal magnetized area of the waveguide tube, a helical sonic return signal is produced in the waveguide tube. A magnetostrictive receiving transducer located outside of the housing is connected through the housing to the waveguide tube for sensing the helical re-turn signal and producing an electrical signal to a meter or other indicator as an indication of the position of the ring-like magnet assembly and, thus, the piston. Precisely locating the piston also results in precisely locating the position of the ram. In addition, from the information provided by additional pulses and the timing of such pulses, the velocity and the rate of movement of the ram can also be determined.

The packer wear surface of the ram that makes contact with the outside of the well pipe is critical to the sealing of the annulus. When the packer wear pads are new, the closed position of the ram can be determined in the manner described above. After the ram has been used, the closed position of the rain with respect to the historical original position is an indication of the amount of wear on the wear pads or packer. If a worn wear pad can be replaced while the well is otherwise shut down, and before it fails in service, then costly shut-down of the well at an inconvenient time or damage caused by failure can be avoided. Other uses of the exact precision position, velocity and rate information can be made by the well operator.

BRIEF DESCRIPTION OF THE DRAWINGS

So that the manner in which the above-recited features, advantages and objects of the invention, as well as others which will become apparent, are attained and can be understood in detail, more particular description of the invention may be had by reference to the exemplary embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings.

DESCRIPTION OF PREFERRED EMBODIMENTS

Figure 1:
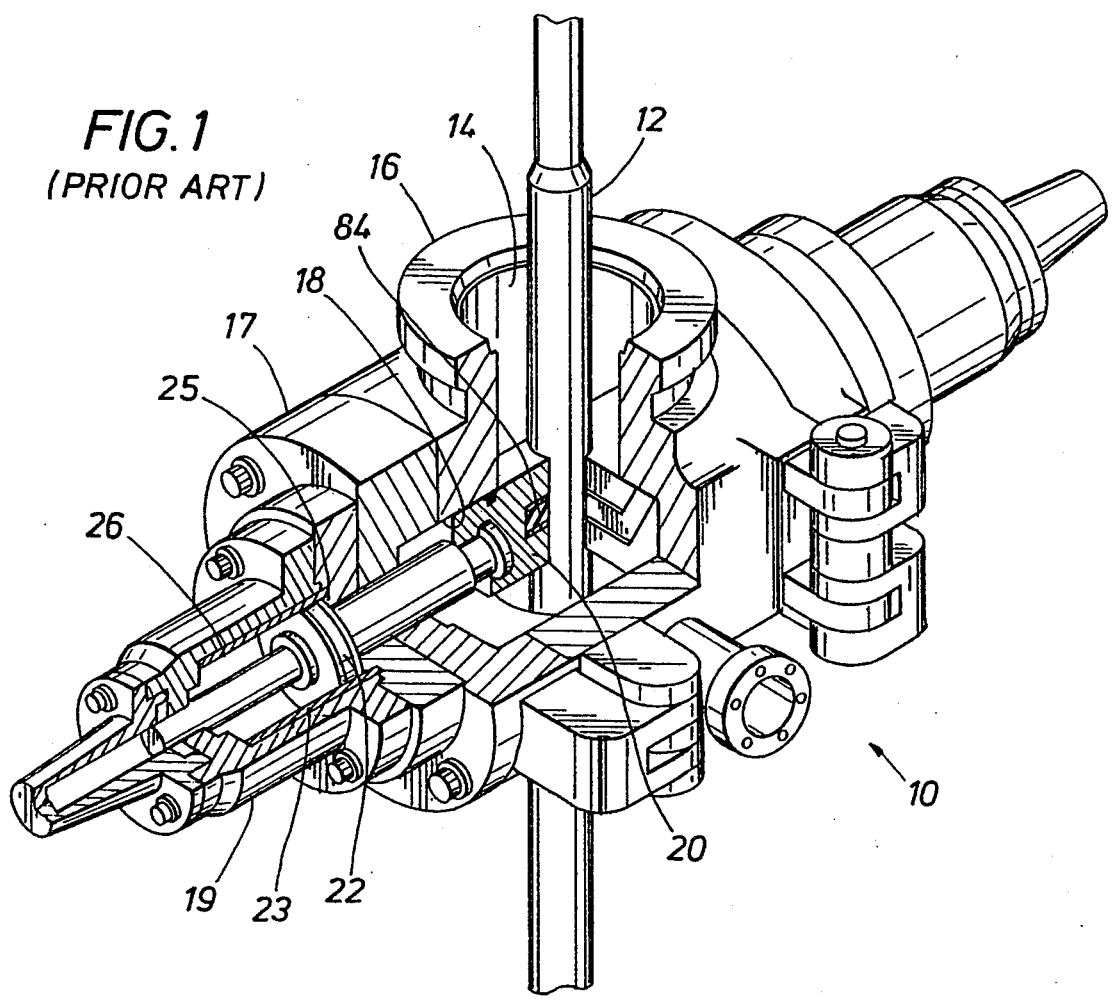
FIG. 1 is a pictorial oblique view of a typical ram-type blowout preventer with which the current invention is used.

Now referring to the drawings, and first to FIG. 1, a ram-type blowout preventer 10 is illustrated. A well pipe 12, which can be part of a drill string located at the top of a well being drilled or a part of a production string of a well under oil or gas production, is shown passing through a center bore or opening 14 in the housing or block 16 of the blowout preventer. The block includes opposing guideways 18 transverse to opening 14, which guideways extend outwardly into bonnets 17 connected to block 16. Operating in guideways 18 are rams 20 driven by hydraulic pistons 22 in their respective cylinder liners 23 located in respective cylinders 19 connected outwardly of bonnets 17. The pistons reciprocate the rams back and forth in the guideways and to open and close packers or wear pads 24 in the faces of rams 20 with respect to the surface of pipe 12. The hydraulic fluid connections are not shown specifically in the drawing, but are well known in the art, and operate in connection with opening chamber 25 and closing chamber 26. The tail of the piston reciprocates within a cylinder head 19, bolted to a bonnet 17.

Figure 4:
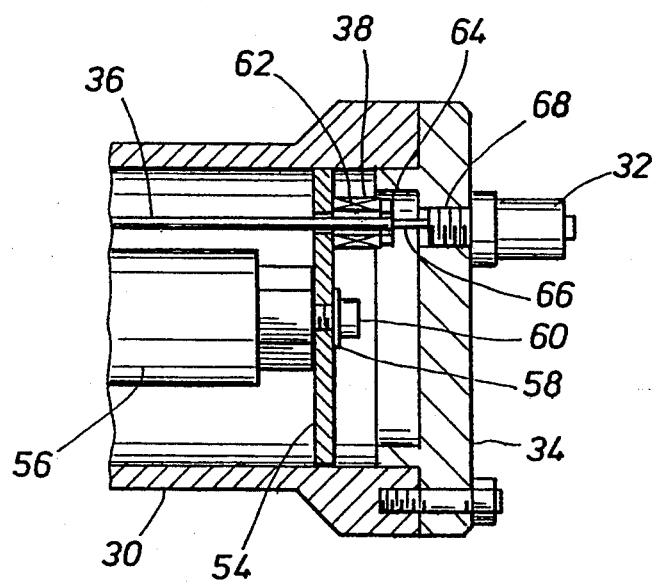
FIG. 4 is a close-up view of part of FIG. 3.

It is desirable to exactly know or to locate the position of rams 20. This is accomplished by separating the parts of a magnetostrictive linear displacement device to locate some of the components within a cylinder head enclosure 30, shown in FIGS. 2 and 3, which connect to cylinder 19 shown in FIG. 1. As will be explained below and shown in FIG. 4, a transducer 32 located on the outside of enclosure 30 is connected to the internal parts of the device through end cap 34 attached to the cylinder head enclosure 30. Transducer 32 produces an electrical signal to a meter or other indicator and/or to a control console.

Figure 5:
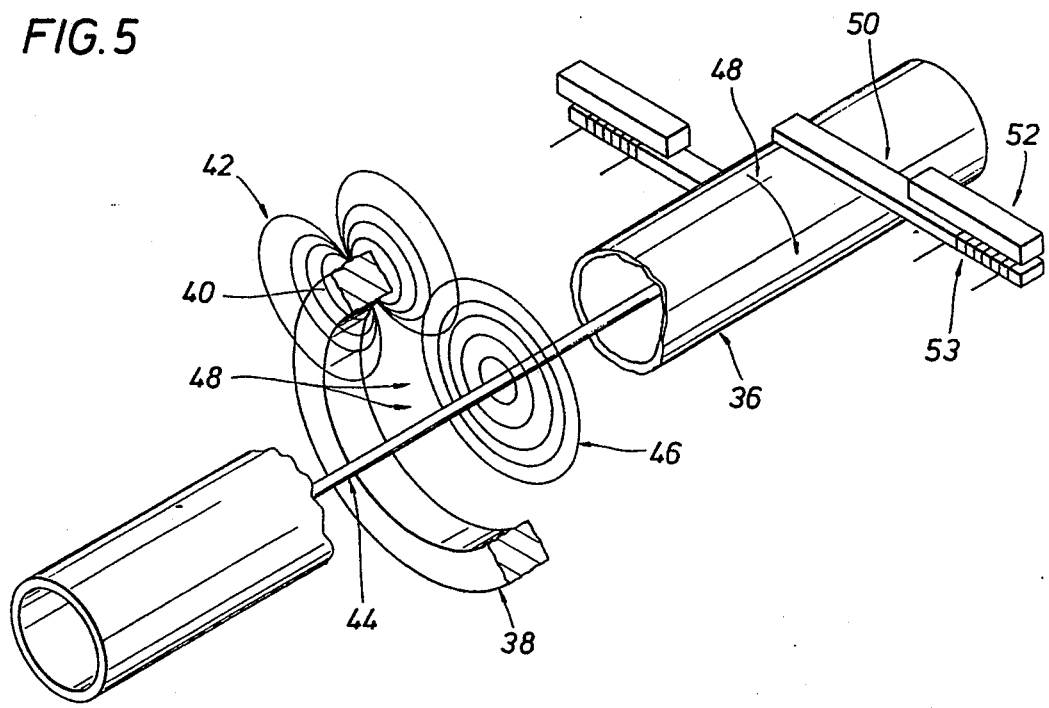
FIG. 5 is a schematic diagram of the magnetic and magnetostrictive forces present in operation of the present invention.

Now referring to FIG. 5, a schematic representation of a magnetostrictive linear displacement device is shown. Magnetostriction refers to the ability of some metals, such as iron or nickel or iron-nickel alloys, to expand or contract when placed in a magnetic field. A magnetostrictive waveguide tube 36 has an area within an external magnet assembly 38 that is longitudinally magnetized as assembly 38 is translated longitudinally about tube 36. Assembly 38 includes typically four permanent magnets 40 located at evenly spaced positions 90° apart from each other, in a plane transverse to tube 36, and radially equally spaced with respect to the surface of tube 36. More than four magnets can be used, if desired. External magnetic field 42 is established, which as previously mentioned, longitudinally magnetizes an area of tube 36.

Tube 36 surrounds a conducting element or wire 44 located along its axis, which wire is periodically pulsed or interrogated with an electrical current in a manner well-known in the art. Such a current produces a toroidal magnetic field 46 around wire 44 and tube 36. When toroidal magnetic field 46 intersects with field 42 at positions 48, a helical magnetic field is induced in tube 36 to produce a sonic pulse that travels toward both ends of the tube. Suitable dampers, not shown, at the ends prevent echo reverberations of the pulse from occurring. However, at the transducer end or head, the helical wave is transformed to a waveguide twist 48, which exerts a lateral stress in very thin magnetostrictive tapes 50. A phenomenon known as the Villari effect causes flux linkages from magnets 52 running through sensing coils 53 to be disturbed by the traveling stress waves in the tapes and to develop a voltage across the coils. This voltage is subsequently amplified for metering or control purposes.

Because the current pulse travels at nearly the speed of light, and the acoustical wave pulse travels roughly at only the speed of sound, a time interval exists between the instant that the head-end transducer receives each pulse compared with the timing of the electrical pulse produced by the head-end electronics. This time interval is a function of the distance that external magnet assembly 38 is from the head end of the tube. By carefully measuring the time interval and dividing by the tube's velocity of propagation, the absolute distance of the magnet assembly from the head end of the tube can be determined.

It is well-known that the acoustic waveguide tube is made of materials especially temperature stable. Therefore, such a tube is especially appropriate for use in the instrumentation described below in a blowout preventer application.

Returning to FIGS. 2, 3 and 4, piston 22 is shown in its fully closed position in FIG. 2 and is shown in its fully opened position in FIG. 3. A carrier 54, especially easily seen in FIG. 4, for magnet carrier 38 is attached to piston tail 56 via retainer 58 and screw 60.

Figure 2:
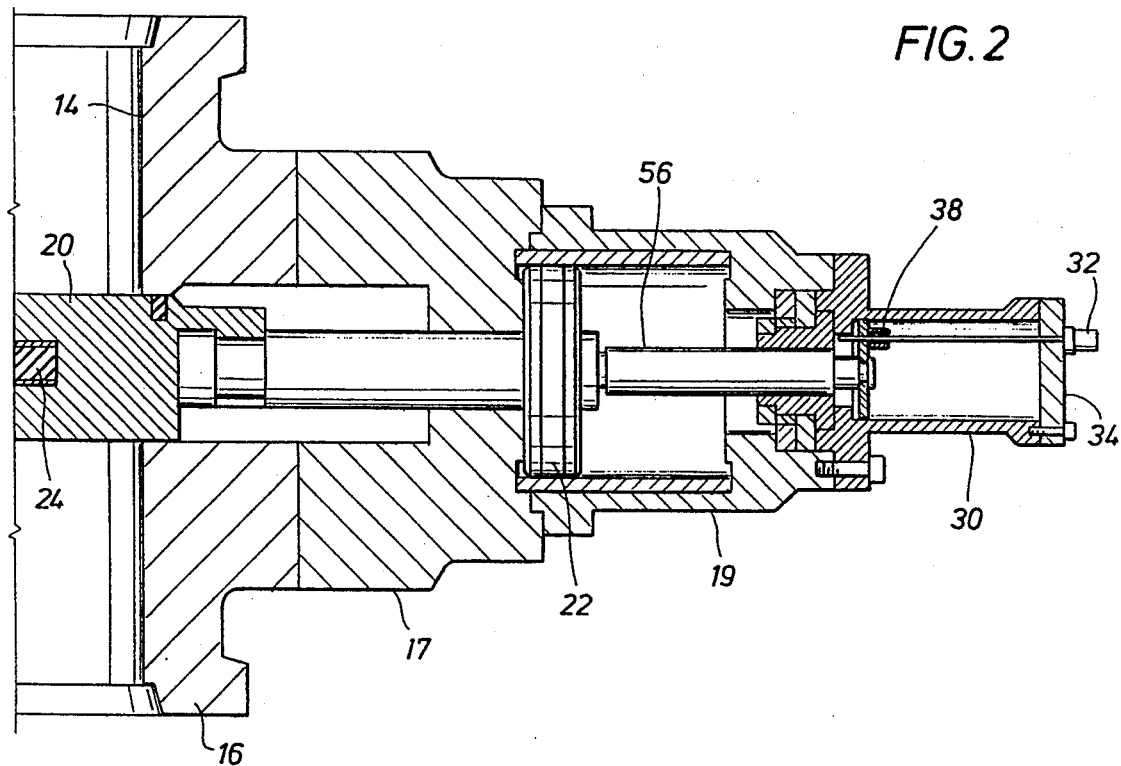
FIG. 2 is a cross-sectional view of a portion of a blowout preventer in accordance with a preferred embodiment of the present invention, the preventer being shown in its closed position.
Figure 3:
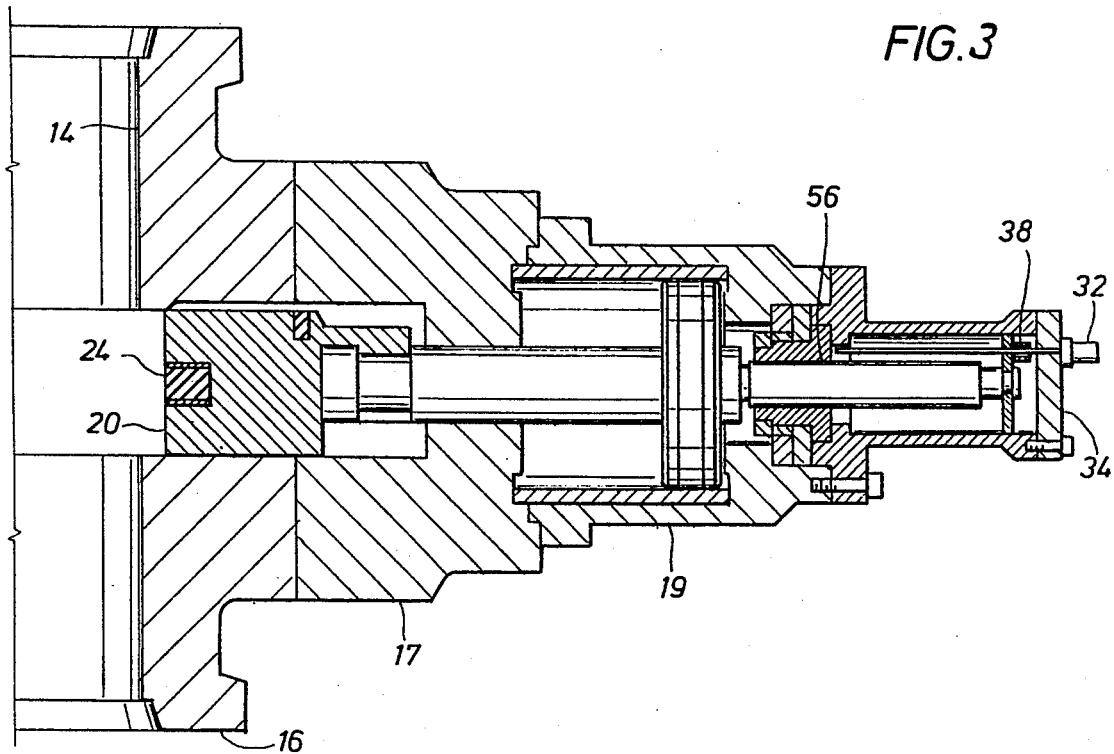
FIG. 3 is a cross-sectional view of the same portion of the blowout preventer as that shown in FIG. 2, the preventer being shown in its open position.

Stationary waveguide tube 36 is located within cylinder head 30 parallel to the axis or the center line of the piston tail and is spaced therefrom so as not to interfere with the movement of piston 22. Ring-like magnet assembly 38 is located about and spaced apart from tube 36 and is located at a distance from carrier 54 determined by spacer 62. The magnets in the assembly are in a plane transverse to tube 36. Non-magnetic screws 64 are used to mount magnet assembly 38 and spacer 62 to carrier 54. It will be seen that carrier 54 along with spacer 62 and assembly 38 are shown in two positions. In FIG. 2, assembly 38 is in its fully closed position and assembly 38 is in its fully open position in FIG. 3. It should be noted that as carrier 54 translates from left to right, there is no contact, and thus no wear, of assembly 38 or the surface of tube 36.

Conducting element or wire 66 is located through the center of waveguide tube 36. Both wire 66 and tube 36 are connected to transducer 32, located external to cap 34, which transducer assembly also includes suitable means for placing an interrogation electrical current pulse on wire 66. An O-ring 68 is used to seal end cap 34 against leaks.

It may be noted that as ram 20 moves axially, assembly 38 will be moved by the same amount. Thus, by the operation of the magnetostrictive linear displacement device incorporated therewith, it is possible to absolutely determine on a continuous basis the position of ram 20. In the event of loss of signal, there is no loss of information or re-zeroing or re-homing of any reading. The reading is absolutely determined by the location of assembly 38 with respect to transducer 32, as discussed above in connection with FIGS. 2, 3 and 4.

With the knowledge of the absolute position of the ram, it can be determined if the ram is completely closed, if the ram is hung up, to what degree the packer or wear pad on the front of the ram is worn, and to what degree there is backlash or wear in the piston mechanism. From successive interrogation pulses, it is also possible to measure piston closing speed or velocity and the rate of movement or acceleration and deceleration of the piston.

It should be noted that the position, velocity and acceleration instrumentation that has been described has only one moving part, magnet assembly 38, and this is a non-contacting part. Thus, there is no wear problem.

Figure 6:
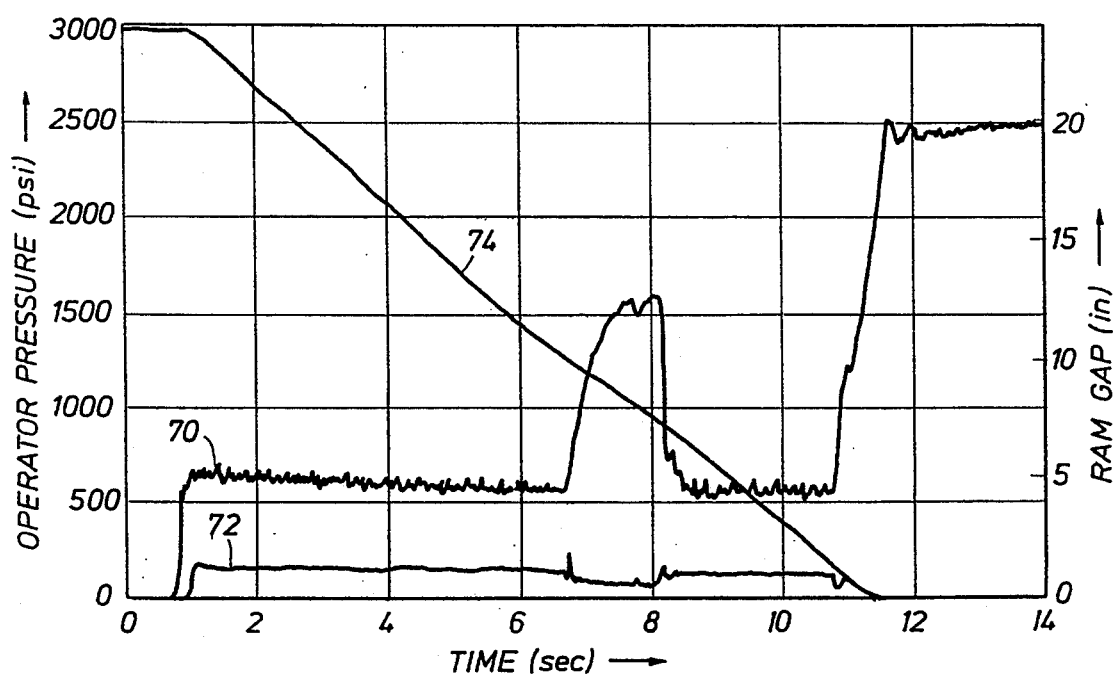
FIG. 6 is a graphic representation of the closing of a shear ram.

It has previously been mentioned that the information provided in the past for operating a blowout preventer has primarily been pressure readings. FIG. 6 illustrates closing pressure 70 on the closing side of a shear ram and, on the open side, opening pressure 72 of the ram as ram gap 74 is measured in accordance with the present invention. Both pressures are substantially uniform until the shear ram of the preventer makes contact, at which time the closing pressure jumps up. The closing pressure again stabilizes after the pipe is severed until the annulus is sealed. Then, the closing pressure reaches its maximum level. Although there is meaningful information provided in the pressure signals there is more information provided in the ram gap signal in accordance with the present invention. Probably the most information is provided by having both pressure and ram position information provided to the operator.

While position instrumentation of one ram of a blowout preventer has been shown and described, it is possible, if desired, to independently instrument both rams of the blowout preventer. Also, the instrumentation of only one type of blowout preventer has been shown in FIG. 1 and another described in connection with FIG. 6, it will be understood that the invention is not limited to a single type, but can be employed with any type of ram blowout preventer. Since many modifications may be made and will become apparent to those skilled in the art, it will be understood that the invention is not limited only to the embodiments of the invention that have been described and illustrated.

What is claimed is:

1. An electromagnetic ram location device for a well head blowout preventer, comprising
a ram housing having a vertical bore to receive a well pipe and opposed guideways extending from the bore,
rams reciprocal within the respective guideways for opening and closing the vertical bore,
movable hydraulic pistons connected for positioning the respective rams, said pistons being located within an extension of said ram housing, and
electromagnetic induction instrumentation operably connected without being invasive of said ram housing to one of said pistons for absolutely determining its location as it closes and opens.

2. An electromagnetic ram location device in accordance with claim 1, wherein said electromagnetic instrumentation includes a sensor for directly continuously sensing the position of said one of said pistons.

3. An electromagnetic ram location device in accordance with claim 2, wherein a portion of said sensor is located within said ram housing extension and is operably reciprocal with said one of said pistons.

4. An electromagnetic ram location device in accordance with claim 1, wherein a first portion of said sensor is located within said ram housing and is operably reciprocal with said one of said pistons and a second portion of said sensor is located external to said ram housing.

* * * * *